June 22, 1926.
W. R. GRACE
MIXING MACHINE
Filed Dec. 2, 1921
1,590,021
2 Sheets-Sheet 1
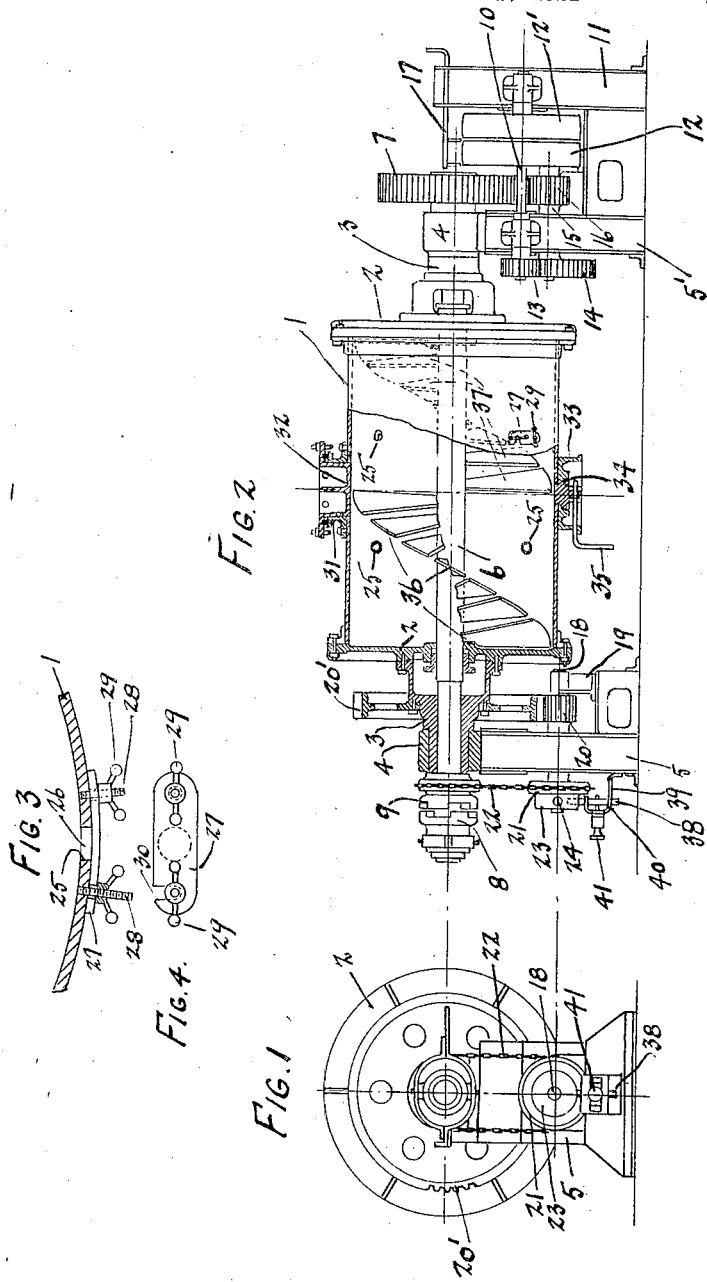

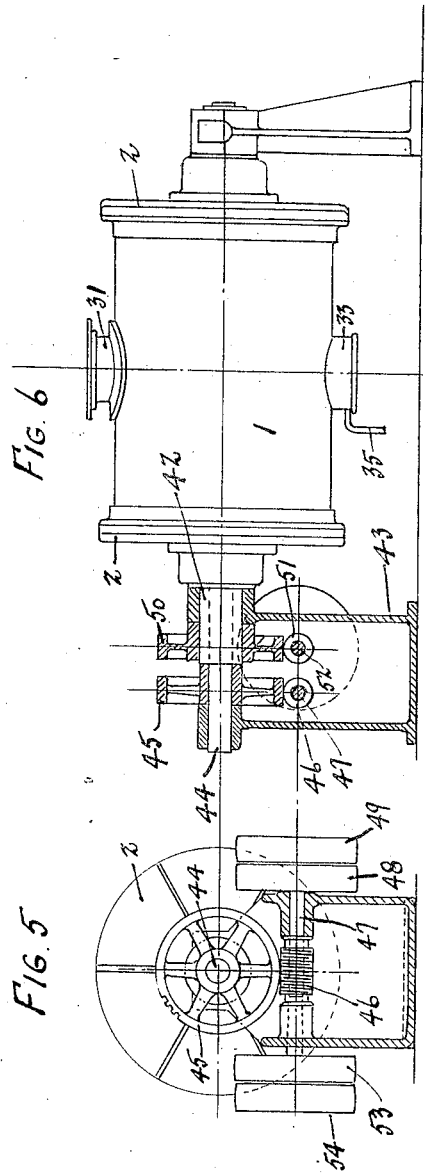

Patented June 22, 1926.

1,590,021

UNITED STATES PATENT OFFICE.

WILLIAM R. GRACE, OF BROOKLYN, NEW YORK, ASSIGNOR TO STEVENS-AYLSWORTH COMPANY, OF NEW YORK, N. Y., A CORPORATION OF NEW YORK.

MIXING MACHINE.

Application filed December 2, 1921. Serial No. 519,360.

My invention relates to mixing machines and is particularly adapted for use in machines for mixing dry materials.

The principal object of the invention is the production of a novel machine of simplicity of construction which shall be adapted to thoroughly and completely perform its mixing function.

Other and further objects and advantages of the invention will appear from the accompanying description, the invention consisting in the novel parts and combinations thereof hereinafter more particularly described and then specified in the claims.

By means of my invention I have produced a machine which is especially adapted for the mixing of drugs where one of the materials is exceedingly poisonous and where it is essential that the finished mixed product should have the poisonous drug evenly and thoroughly distributed throughout the entire mass. The construction of my device eliminates the possibility of some of the poisonous substance adhering to the machine while the mixing operation is being performed and then being discharged in an unmixed condition in a batch or a wad, so to speak, which would seriously endanger the life of one who is unfortunate enough to use that particular portion of the materials containing the highly concentrated, unmixed, poisonous substance.

The invention is equally useful in the standardizing of dyes where it is imperative that the mixed materials be absolutely uniform throughout the entire mass as any small portion of the dye or of the material used in standardizing the dye which might adhere to the machine during the mixing operation would produce a variation in color in the dyed goods which of course is objectionable.

A practical embodiment of the invention is illustrated in the accompanying drawings in which:

Fig. 1 is an end elevation of the machine.

Fig. 2 is a front elevation (partly in section) thereof.

Fig. 3 is a section taken through a portion of the mixing chamber or cylinder.

Fig. 4 is a front elevation of part of the device shown in Fig. 3.

Fig. 5 is an end elevation of a modified form of machine.

Fig. 6 is a front elevation (partly in section) of the modification.

Referring in detail to the drawings:

1 indicates a mixing chamber comprising a cylinder having end plates 2 detachably bolted thereto, said end plates having hollow hub members 3 secured thereto, which are journalled in bearings 4 mounted on suitable standards 5, 5'. 6 indicates a shaft extending longitudinally through the cylinder 1 and through the hub members 3 which carries on one end thereof a gear 7 while on the other end it carries a clutch member 8 fast thereon and a combined clutch member and sprocket 9 loosely mounted thereon.

10 indicates a shaft mounted in bearings on the standard 5' and a standard 11, said shaft carrying the pulley wheel 12 and idler 12' and a gear 13 on the end thereof. Said gear 13 meshes with a gear 14 on a shaft 15 suitably journalled in the standard 5' while the gear 7 meshes with a gear 16 carried on the end of said shaft 15. The pulley 12 is adapted to be connected by a belt (not shown) to any convenient source of power for rotating said pulley, a conventional form of belt-shifter being shown at 17 for shifting the belt to the idler 12' when so desired.

18 indicates a shaft or counter-shaft journalled in bearings on standard 5 and on a standard 19. Said shaft carries a gear 20 and a sprocket 21 suitably connected by a chain 22 with the sprocket portion of the member 9. The sprocket 21 is provided with an extending annular portion 23 preferably integral therewith and having openings 24 in the periphery thereof. The gear 20 meshes with a large gear 20' carried by the hub member 3 adjacent the left side or end of the machine.

When absolute and reliable mixing is to be effected it is desirable to obtain samples from the machine from time to time in order to test them in a laboratory for determining whether the materials have been brought to the standard fineness and excellence. I have therefore provided the cylinder 1 which holds the materials to be mixed with a plurality of openings 25 at various places in the wall thereof out of which openings, when they are opened, a small amount of the mixed or partially mixed material will drop which provides samples for testing purposes. The openings, preferably eight in number are located in separated spots in the wall of the cylinder so that samples may be taken from eight different points. 26 indicates a stopper for each of said openings which is secured to or is integral with a closing plate 27 detachably mounted on threaded bolts 28 secured to the wall of the cylinder adjacent the openings, said closing plate being clamped in position in engagement with the outer wall of the cylinder with the stopper 26 plugging or closing the opening 25 by means of the thumb nuts 29 threading over the bolts 28 and clamped against the plate 27. It will be noted that the plate is provided with a slot 30 receiving one of said bolts 28 whereby the stopper 26 may be removed from the opening, in an obvious manner, by unloosening the thumb nuts 29 and without the necessity of removing the plate from the other bolt.

The mixing chamber or cylinder is filled or partially filled with the materials to be mixed through a somewhat enlarged annular opening or inlet provided with an upstanding side wall 31 suitably bolted to the cylinder and adapted to be closed by a plug 32 which is detachably secured to the wall 31 in any desirable manner. Directly opposite said inlet I have provided an outlet opening also having an upstanding wall 33 surrounding the same and secured to the cylinder, said outlet opening being closed by a removable plug 34 which may be operated by a lever arm 35 forming no part of my invention. It will be noted that the ends or surfaces of the plugs 32 and 34 and of the stoppers 26 are flush with the interior surface of the cylinder so as to preclude the possibility of any of the materials contained in the cylinder from dropping or falling into recesses or pockets where they would not be acted on.

36 indicates blade members fastened to the left-hand side of the shaft 6 within the cylinder and running in a spiral line from the left-hand end of the shaft to a point on the opposite side of the shaft adjacent the central portion thereof. These blade members are separated from each other and have relatively small spaces therebetween and constitute a left-hand helical spiral. 37 indicates separate blade members with spaces therebetween and attached to the right-hand side of the shaft 6 within the cylinder and running in a spiral line from the right-hand end of the shaft to a point on the opposite side of the shaft adjacent the central portion thereof. The blade members 37 constitute a right-hand spiral, said left and right-hand spirals being so positioned that their inner and outer ends are respectively on opposite sides of the shaft. All of the blade members 36 and 37 are of a length whereby their outer ends will just clear the surface of the body of the cylinder when the shaft rotates, while the side of the blade member 36 on the extreme left and of the blade member 37 on the extreme right will just clear the inner surfaces of the end plates or walls 2.

When the pulley wheel 12 revolves the shaft 6 rotates in an obvious manner, the motion being transmitted through gears 13, 14, 16 and 7. If the clutch members 8 and 9 are in engagement it will be apparent that a rotation of the shaft will also effect a rotation of the cylinder in an opposite direction, the motion being transmitted from the shaft through the sprocket portion of member 9, through chain 22, sprocket 21, gear 20 and gear 20'. When it is not desired to rotate the cylinder the clutch members 8 and 9 are disengaged.

When the cylinder is charged with materials to be mixed a most thorough and effective mixing is obtained by rotating both the shaft and cylinder each in a direction opposite to the other as has been explained. The helical spirals heretofore described will scrape the inner surface of the cylinder and the position or construction of said helical spirals (one left-hand and the other right-hand) will throw the materials from the ends towards the center of the cylinder, parts of the materials passing through the spaces intermediate the various blade elements of the spirals. Thus all parts of the materials will be forced into contact with all other parts and a very thorough, uniform and reliable mixing is obtained.

In order to empty the cylinder of its contents it is very desirable that the cylinder remain stationary and that the spirals continue to revolve to throw the materials from the ends of the cylinder to the center thus clearing the machine entirely of the mixed materials. If the cylinder were rotated during the process of emptying, the materials would be scattered very much and if they were very finely ground much would be lost in the form of dust. When the clutch members 8 and 9 are released from engagement with each other the cylinder ceases to rotate as has been described. To lock the cylinder in any desired position, however, in order to facilitate the charging or discharging operation, I have provided a locking rod 38 carried by a bracket 39 the end of which is adapted to enter any of the openings 24 in the member 23, whereby the sprocket 21, and obviously the cylinder, will be held or locked against movement. The rod 38 is held in interlocked position with the member 23 by a pin 40 extending through said rod and operable by a handle or knob 41 mounted on the bracket 39.

It is obvious that the cylinder must remain stationary when being charged but it is desirable to have the shaft rotate during the charging operation as the helical spirals will do some of the mixing while the cylinder is being charged. When the cylinder is fully charged the materials are already more or less mixed, the final, thorough and absolute mixing taking place by rotation of the cylinder when the spirals are also rotating.

In the modification shown in Figs. 5 and 6 I have provided separate means for rotating the shaft and cylinder each independently of the other. In the figures one of the hollow hub members of the cylinder is indicated at 42 and is suitably supported by the standard 43. The main or cylinder shaft is indicated at 44 and it extends through the hollow hub member 42. Carried by said shaft is a gear 45 meshing with a worm 46 on a shaft 47 journalled in suitable bearings on the side walls of bracket 43. The said shaft 47 carries a pulley and idler 48 and 49 respectively connected by a belt (not shown) with a suitable source of power. Obviously when the pulley 48 rotates the main shaft 44 is rotated due to the connections described. 50 indicates a gear carried by the hub member 42 and meshing with a worm 51 on a shaft 52 which likewise is journalled in bearings on the side members of bracket 43. The shaft 52 also carries a pulley and idler 53 and 54 respectively connected to a source of power. When the pulley 53 rotates the cylinder is rotated as is obvious.

By using the worm gears of the modification, no additional latch or lock is necessary to lock the cylinder in any position as in the preferred form of the invention, as the worm will hold it against movement in any given position.

What I claim as my invention is:—

1. In an apparatus of the character described, a mixing chamber, spirally arranged sets of relatively wide fan-shaped mixing blades rotatably mounted within said chamber, a rotatable shaft for supporting said blades, said blades extending from said shaft to points adjacent the walls of said chamber and having the adjacent edges thereof separated by relatively narrow spaces and angularly disposed throughout substantially their entire length, each of said sets extending from an end of said chamber to one and the same intermediate point in said chamber spaced from the ends thereof, the sets in the different ends of said chamber having the spiral arrangement thereof extending in right and left hand directions respectively, the angular disposition of said blades corresponding to the direction of said spiral arrangement, and the inner end blades of said sets adjacent said intermediate point extending in different directions from the rotating axis thereof.

2. In an apparatus of the character described, a longitudinally disposed rotatable mixing chamber, means for introducing material into said chamber, the walls of said chamber being formed with a plurality of relatively small sampling openings spaced throughout the length of said chamber, and closures for said openings, whereby samples of the mixture within the chamber may be obtained at different points along said chamber.

3. In an apparatus of the character described, a mixing chamber provided with inlet and outlet openings and with a plurality of separated sampling openings in the wall thereof, removable plugs for said inlet and outlet openings having ends completely filling said openings and flush with the inner wall of the chamber, removable stoppers for said sampling openings having ends completely filling said openings and flush with the inner wall of the chamber, a shaft extending through said chamber, mixing blades secured to said shaft and means for rotating said shaft.

4. In an apparatus of the character described, a rotatable mixing chamber, a shaft extending therethrough, mixing members secured to said shaft, means for rotating said shaft, clutch members on said shaft, a support, a second shaft journalled therein, means connecting one of said clutch members and said second shaft, means for locking said second shaft against rotation and means connecting said second shaft and said mixing chamber.

5. An apparatus of the character described including a chamber formed with an opening, a plate normally closing said opening, a stopper secured to said plate and extending into said opening and means for retaining said plate in position.

6. An apparatus of the character described including a chamber formed with an opening, a plate normally closing said opening, a stopper secured to said plate and extending into said opening and a bolt extending through said plate, said plate being formed with a slot, a second bolt extending through said slot and means associated with both the said bolts and bearing against said plate for retaining the latter in position.

7. In an apparatus of the character described, a mixing chamber, a shaft extending through the same, means for rotating said shaft, a counter-shaft, means connecting both the said shafts one to the other, means connecting said counter-shaft with said mixing chamber whereby the latter may be rotated when the first named shaft is rotating and means whereby said counter-shaft may be locked against rotation.

8. In an apparatus of the character described, a mixing chamber, a shaft extending through the same, means for rotating said shaft, a counter-shaft, means connecting both the said shafts one to the other, means connecting said counter-shaft with said mixing chamber whereby the latter may be rotated when the first named shaft is rotating means secured to said counter-shaft and providing a member formed with an opening and a pin adapted to enter said opening to lock said counter shaft against rotation.

9. In an apparatus of the character described, a cylinder, a shaft extending through said cylinder, agitating means attached to said shaft, means whereby said shaft and cylinder may be rotated in opposite directions and means for locking one of said members against movement.

Signed at New York in the county of New York and State of New York this 30th day of November A. D. 1921.

WILLIAM R. GRACE.